UNITED STATES PATENT OFFICE.

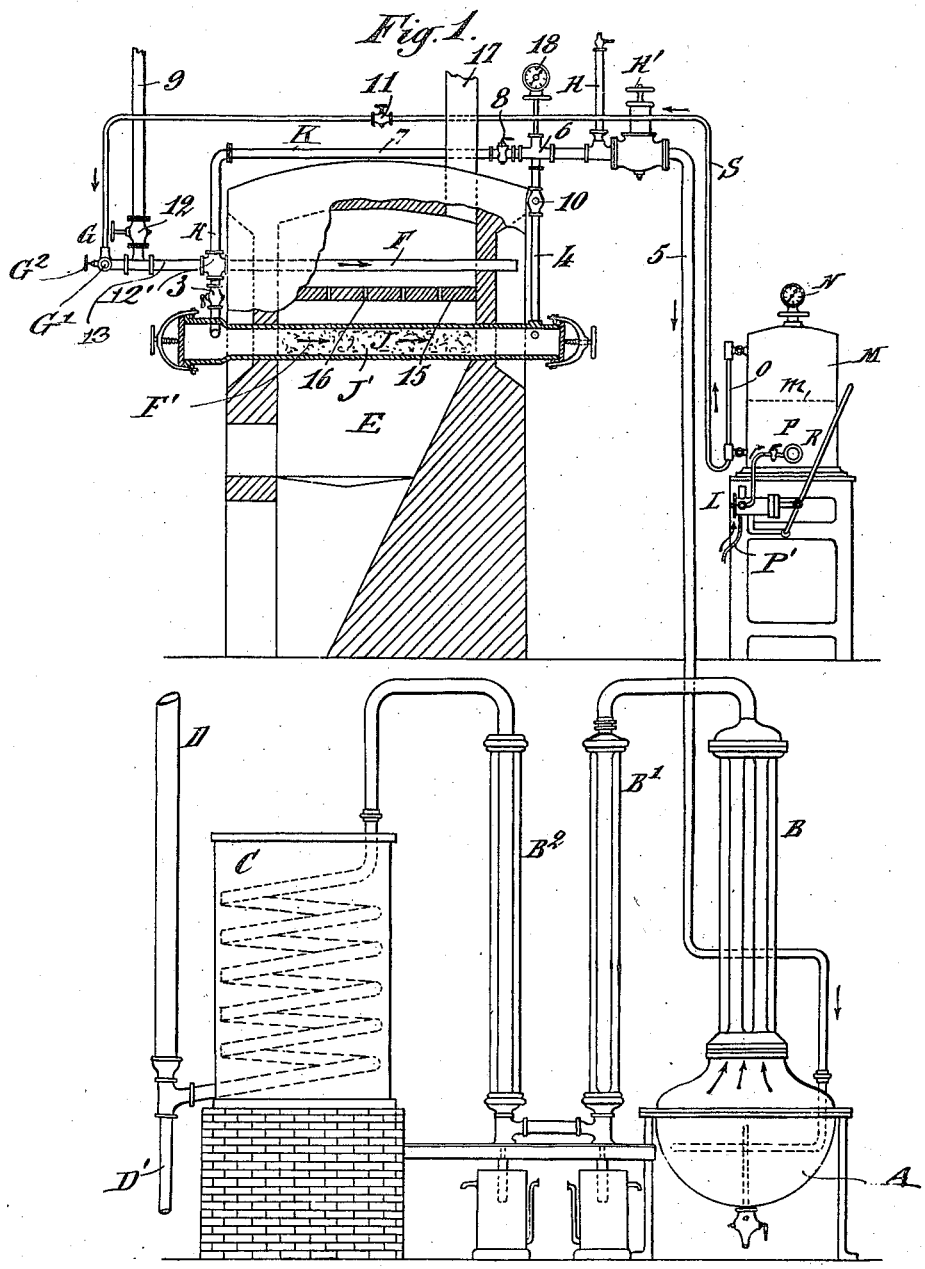

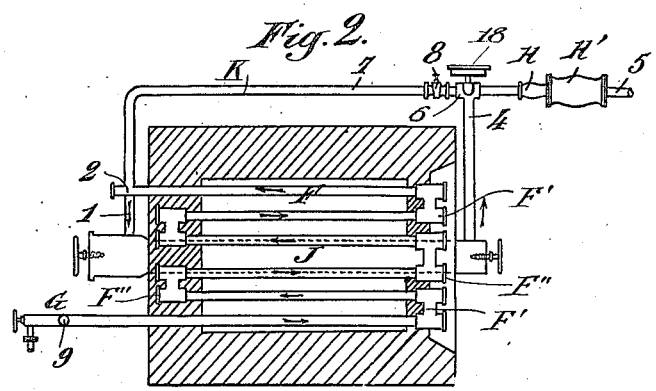

AUGUSTE TESTELIN, OF LAEKEN, AND GEORGES RENARD, OF IXELLES, BELGIUM.

APPARATUS FOR THE INDUSTRIAL MANUFACTURE OF A NEW SPIRIT BY THE ISOMERIZATION OF PETROLEUM.

1,138,260.          Specification of Letters Patent.          Patented May 4, 1915.

Application filed August 20, 1908. Serial No. 449,538.

*To all whom it may concern:*

Be it known that we, AUGUSTE TESTELIN and GEORGES RENARD, subjects of the King of Belgium, residing, respectively, at 304 Rue des Palais, Laeken, and 125 Rue du Trone, Ixelles, Belgium, have invented certain new and useful Improvements in Apparatus for the Industrial Manufacture of a New Spirit by the Isomerization of Petroleum; and we do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to an improved heat treatment for petroleum and the manufacture thereby of a new spirit which is highly refractive, very mobile, volatile and inflammable, and which has a particularly wide solvent power, and an ethereal, penetrating, and characteristic odor, quite distinct from the odor of petroleum, of which no trace remains.

The commonly used modes of treating petroleum are progressive distillation, generally fractional, in which the different hydrocarbon compounds are successively distilled, in the order of their volatility.

My improved method comprises catalytic and distillatory actions thereby forming new compounds. The heating elements are small, operate under a high pressure (about five atmospheres) and at high temperatures (as high as three or four times the mean of the boiling points of the liquids) and the highest temperature retort contains a permeable, refractory, catalytic obstruction; the petroleum is atomized under pressure and brought into the heating elements by steam; and intense heat is directly and intimately applied to very freely-divided particles, practically globules of steam and petroleum, during a very short traverse; such particles being practically instantaneously volatilized and broken up, it may be while disposed between the particles of the catalytic obstruction, into new compounds some of which are catalytic and the entire heat treatment of each particle is completed in a very brief period, in one operation, without intermediate condensations and re-vaporizations.

From the heating elements the product is discharged, suitably reduced in pressure, to fractionating condensers, which separate the several permanent compounds, as is usual in such apparatus. The petroleums of commerce, whose density or specific gravity varies from .800 to .820, suitably treated in this apparatus, undergo modifications more or less profound, and controllable by varying the pressure, the temperature and the duration of the treatment per molecule. The product includes distillates, isomeric transformations, and products of decomposition; and my new spirit. The liquid is changed in density. Light and heavy hydrocarbons are formed simultaneously, the proportions of the several kinds depending upon the pressure, the temperatures and the duration of the treatment of a given quantity. The heavy products can be re-treated and transformed into light spirit.

The greatest proportion of light and highly volatile product is obtained by superheating until there is a slight production of permanent gases. The process is highly economical; with illuminating petroleum there is no appreciable loss. In general terms the apparatus comprises a furnace containing the heating elements; supply apparatus; fractionating condensing apparatus; and a valved, regulated and gaged pipe system for the feed and distribution of fluids and the regulation of their pressure.

The furnace may be of a type suitable to be fired with the most convenient fuel. The heating elements extend through the furnace, are adapted to be readily cleaned and comprise a primary heater or volatilizer, preferably a sinuous pipe arranged as a grid; and a high-heat cast iron retort or converter containing a permeable, refractory catalytic obstruction such as suitable clay or clays.

The condensing series preferably comprises a reflux, a plurality of fractionating condensers and a final condenser. The supply system comprises sources (not shown) of oil, compressed air and steam; a closed, gaged feed and pressure regulating tank, an oil supply line and force pumps to force oil, and a compressed air line and check valve to admit compressed air into the tank, the compressed air to equalize the pressure in the tank and the oil-feed.

The distributing pipe system comprises a valved oil feed pipe connecting the tank with the steam supply and injector and the latter with the primary heating element or volatilizer; a valved pipe between the delivery end of said element and the inlet end of the retort or converter; and a valved delivery pipe connecting the delivery end of the retort with the condenser and, through a by-pass, with the delivery end of the primary heating element and the inlet end of the retort; and, in the delivery pipe, a shock absorber to sustain detonations and a pressure regulator to reduce and regulate the pressure at which the output is delivered to the condensers. Needle valves (not shown) are provided in the lines as and for the purposes usual in such apparatus.

In the drawings, Figure 1 is a general diagrammatic elevation, partly in section; Fig. 2 a sectional plan of the furnace on the line X—Y—Z—W of Fig. 3, showing the heating elements and their connections; and Fig. 3 is a front elevation of the furnace.

In the practise of my invention I provide a furnace, E, of a type suitable for using the most convenient fuel and containing a combustion chamber and a heating chamber separated therefrom by a refractory diaphragm 15 pierced with holes 16. The furnace flue is indicated by 17.

The heating elements comprise a primary heater or volatilizer F protected from the fire by the diaphragm 15, and heated by convection, preferably a sinuous iron pipe in the form of a grid made of straight tubes extending through said heating chamber spaced about two diameters center to center and united by H-shaped couplings F' whose outstanding ends are closed by plugs F'' which can be removed for cleaning the tubes; and a cast iron retort or converted J, which extends through the combustion chamber, contains a catalytic obstruction J' made from suitable refractory material, such as clay or clays, and whose protruding ends are closed by yoke-mounted, screw-closed caps or in some other manner convenient for periodical cleaning.

The oil supply system comprises a closed, regulating pressure-tank M provided with a pressure gage N and gage-glass O, to show the height of oil in the tank, into which oil from a source not shown is pumped by a force pump L through a supply pipe P' controlled by a valve P, and compressed air to supply losses and equalize the pressure and flow is supplied from a source not shown, through a check-valve R,—the oil standing in said tank substantially at mid-height, as indicated by the dotted line $m$, Fig. 1; and a steam pipe 9 controlled by a valve 12 supplying steam from a source not shown, to the injector G.

The condensing apparatus comprises a pipe connected series of fractionating condensers including a reflux condenser A, a plurality of intermediate fractionating condensers B, $B^1$ and $B^2$, a final condenser C and therefrom delivery pipes D' and D for the final liquid and gaseous derivatives.

The pipe system includes an oil feed pipe S controlled by a valve 11 connecting the tank M with the atomizer or injector G; a pipe 13 connecting the injector G with the primary heater F; a valved pipe 1 controlled by a valve 3 connecting the delivery end of said heater with the inlet end of the retort J; a delivery pipe line 4—5 controlled by a valve 10 connecting the delivery end of the retort J with the reflux condenser A, and by a by-pass 7, controlled by a valve 8, with the delivery end of the primary heater F, and the inlet end of the retort. In the pipe line 4—5 are a pressure gage 18, a shock absorber H, preferably an air chamber, to absorb the shocks of detonations, and a pressure regulator H' to reduce and regulate the pressure suitable for the condensers.

The operation of the plant is as follows: The furnace E is lighted and steam at about five atmospheres is admitted through the steam pipe 9 and valve 12 to the primary heater F, and thence to the condensers which serves to carry along and superheat the liquids operated upon. Oil and compressed air are supplied to the tank M until the oil stands therein substantially at the level indicated by the dotted line $m$, Fig. 1, and the gage N indicates the desired pressure; but while heating up, the valve 11 remains closed and no oil is admitted to the heating elements; and the retort J is by-passed by closing the valve 3 and the valve 10.

In the ordinary practice the primary heater F is maintained at a temperature not less than 400 or more than 450° C. and the retort J at a red heat; which is facilitated by the location of the retort in the combustion chamber exposed to the direct heat of the fire and the separation therefrom by the diaphragm 15, of the primary heater, to which heat is conducted by the products of combustion which pass through the holes 16. As soon as the primary heater F, by-pass 7 and delivery pipe 5 are heated to the desired temperatures, the pump L is started to supply oil, the valve 11 is opened and it, the steam valve 12 and the injector G are adjusted so that the oil and water issuing from the condensers are substantially equal in volume.

If the retort J be kept by-passed, the remainder of the apparatus constitutes and is operable as a still and the output will be products of distillation. For its other and main use, after the apparatus is properly heated, the by-pass valve 8 is closed and the valves 3 and 10 are opened, thereby establishing the circuit for the steam and oil, from the injector G through the primary heater F, retort J and delivery pipe line 4—5 to the condensers.

The oil is atomized by the steam at the injector, carried with it in a finely divided state into the primary heater F, where both are super-heated and made true or gaseous vapors, and thence into the retort J and through the catalytic obstruction J'. In the retort and catalytic obstruction, mainly in the latter, each particle of steam and hydro-carbon comes into intimate contact with highly heated surfaces and reactions take place which break them up into new compounds, contemporaneous with which compounds the new spirit is formed. Thence the products pass through the pipe 4 to the pressure regulator H', which reduces the pressure suitably for the condensing plant, and on, by the pipe 5, to the condensers.

The desired pressures and temperatures and quality of the product are easily maintained. Because of the practically instantaneous action of the apparatus and the small quantities of oil and steam acted upon at any instant, small quantities of the products can be taken from the condensers at suitable intervals and tested to check the results obtained. The pressure gage N and gage glass O on the tank M enable the operator to maintain the proper stand of oil and pressure therein, and a regular feed of oil.

The pressure gage 18 in the delivery pipe and the colors in the furnace enable him to determine the conditions existing in the heating elements, so that he can maintain them normal. To do so he regulates the rate of work by graduating the openings of the oil and steam valves 11 and 9 or preferably by means of the injector G. If the temperatures tend to become too high, he admits more oil and steam, increases the rates of work and abstraction of heat and thereby causes the temperatures to tend to become normal; while if the temperatures tend to become too low, he admits less oil and steam, decreases the rates of work and abstraction of heat, and thereby causes the temperatures to tend to rise. It is, of course, understood that proper maintenance and regulation of the furnace fire in great measure obviates the necessity for varying the rates of oil and steam supply.

Because of the intimate contacts of the superheated oil and steam in the retort J and catalytic obstruction J', the reactions generally occur practically in detonations, which cause rapidly succeeding pressure oscillations or shocks, which are cushioned and rendered harmless by the shock absorber or air chamber H. The proper reading of the gage 18 is the mean of such pressure oscillations. If the products show too large a proportion of hydro-carbons, the by-pass valve 8 can be opened for short intervals and the vapors and gases re-passed through the retort J, for further reactions.

The distillates and heavy hydrocarbons from the reflux and other stills can be returned to the heating elements for additional treatment and suitable arrangements not necessary to set forth, can be made for that purpose, so as to produce the maximum proportion of spirit. If the reactions occur at too low a temperature, little or no light spirit will be produced; while if the temperature be too high too much gas and too little spirit will be produced.

It is evident to those skilled in the art that the operation of this apparatus is analogous to that of the fixing chamber of water gas plants, in which the enriching oil practically at atmospheric pressure is subjected to a very high temperature and thereby converted into permanent gas. In this apparatus the temperature is lower because the desired product is spirit, not gas; and the pressure is very much higher because the desired reactions are functions of both temperature and pressure and as the pressure is increased the reaction-temperature necessary to produce spirit becomes lower. Therefore by maintaining a high pressure it is practicable to cause the desired reactions by a temperature such as to assure the production of the maximum proportion of the desired spirit, with the minimum of gas and heavy hydrocarbons.

Vaporization and superheating take place in the primary heater F and the reactions mainly in the red hot catalytic obstruction J', which diffuse the hydro-carbons passing through it, the reactions being possible in such a small space and short time because of the catalytic nature of certain of the hydro-carbons, under such conditions; and instantly, that the reactions occur, the rapid circulation removes the product from the heat zone to the condensers. It will be seen that this process is characterized by practically instantaneous vaporization and transformation, and it may be by decomposition. The petroleum disappears as such, being converted into hydro-carbon including a small proportion of gas and liquids whose densities will run from .600 to the density of the petroleum; and whose proportions vary with the pressure and temperature and the duration of their subjection to heat. After the most advantageous temperature and pressure conditions are established by practice they are easily maintained and the output will be thereby maintained uniform.

The principal uses of the new spirit obtained by this process are:—As fuel for explosive engines; as a solvent in varnishes and colors; and as a cleansing and extracting agent as in autoclave and displacement apparatus. There are known types of high-temperature reaction apparatus and processes for manufacturing volatile hydro-carbons by "cracking" or causing chemical reactions, the formation of new compounds and changing the proportions of existing compounds among the different hydro-carbons mixed in petroleum and its vapors. So far as I am aware, prior to the date of my invention, such apparatus and processes contemplated treating commercial hydro-carbons, some singly, some in connections with substances carrying hydrogen, carbon and another element or elements, but none contemplated increasing the proportion of hydrogen in the output above that contained in the original hydro-carbons. On the contrary, the enriched water gas process atomizes oil in a mixture of carbon monoxid and free hydrogen and subjects them to white or bright cherry heat, thereby causing the oil to break up, assimilate free hydrogen and form new compounds of the olefiant and other illuminant groups. All of these are low-pressure processes. My present invention is related to the latter, not the former; but is characterized by higher pressures, which enable me to cause reactions at temperatures much lower than obtain in gas-enrichers, and to produce the maximum of spirit with the minimum of gas and heavy hydro-carbons.

I introduce (at about five atmospheres pressure) the fog of steam and atomized oil into the primary heater or volatilizer F, where it is heated to 400° or 450° C. and truly volatilized or converted into true or gaseous vapors; which I pass thence through the retort or converter J and catalytic obstruction J' maintained at red heat. The steam being broken up, supplies free hydrogen intimately mixed, among the cells of the red-hot catalytic obstruction, with the already existing vaporous hydro-carbons by which the liberated hydrogen is assimilated with with which it forms new compounds and the maximum possible proportion of light spirit, under the conditions most conducive to that end.

It is obvious that during the process there is instantaneous release and re-combination of oxygen, which accounts for the detonations which characterize it. While the process and apparatus are especially designed for treating petroleum, they may be used for treating other hydrocarbons.

I claim as new and desire to protect by Letters Patent:

1. An apparatus for the continuous manufacture of volatile spirit from a vaporous mixture of water under pressure and fluid hydro-carbon by heat treatment and comprising a furnace, a container positioned above said furnace and heated by the heat convected from said furnace and adapted for the heat treatment, at an intermediate temperature, of such mixture and its conversion thereby into gaseous vapors; a second container positioned below said first mentioned container and exposed to the direct heat of said furnace and a permeable refractory obstruction in said second container, adapted for the heat treatment, at maximum temperature, of such vapors and to cause reactions among them and rearrangement of their atoms; condensing apparatus; and means to supply such mixture to and distribute its vapors and products thereof among the members of the apparatus.

2. An apparatus for the continuous manufacture of volatile spirit from a mixture of steam and fluid hydro-carbon by heat treatment at high pressure and comprising a furnace containing a combustion chamber, a convected heat chamber and a refractory partition separating the same and pierced with holes for the convection of heat to said convected heat chamber; a container in said convected heat chamber and adapted for the heat treatment at an intermediate temperature, of such mixture and its volatilization thereby into gaseous vapors; a second container located in said combustion chamber and therein a permeable refractory obstruction adapted for the heat treatment at maximum temperature, of such vapors and to cause reactions among them and rearrangement of their atoms; condensing apparatus; means to supply volatile hydrocarbon under pressure thereto and a feed pipe therefrom; steam supply means; means to mix and inject the same into the first mentioned container; and a distributing pipe system to distribute the aforesaid vapors and their derivatives among the containers and condensing apparatus.

3. An apparatus for the continuous manufacture of volatile spirit from a mixture of steam and fluid hydro-carbon by heat treatment at high pressure and comprising a furnace; a container heated by heat convected from said furnace and adapted for the heat treatment, at an intermediate temperature, of such mixture and its conversion thereby into gaseous vapors; a container exposed to the direct heat of said furnace and a permeable, refractory obstruction in said container, adapted for the heat treatment, at maximum temperature, of such vapors and to cause reactions among them and rearrangement of their atoms; condensing apparatus; hydro-carbon supply means comprising a pressure tank adapted to contain fluid hydrocarbon, means to regulate the pressure in and the feed therefrom, means to supply fluid hydro-carbon under pressure thereto and a feed-pipe therefrom; steam-supply means; means to regulate the quantities of steam and of hydro-carbon fed to the apparatus; means to mix and inject the same into the first-named container; a distributing pipe system adapted to distribute the aforesaid vapors and their derivatives among the containers and condensing apparatus; and means to regulate the pressures obtaining among the containers, distributing pipes and condensing apparatus.

4. An apparatus for the continuous manufacture of volatile spirit from a mixture of steam and fluid hydrocarbon by heat treatment at high pressure and comprising a furnace containing a combustion chamber and a convected-heat chamber and a refractory partition separating the same and pierced with holes for the convection of heat to said convected-heat chamber; a sinuous tubular container located in said convected-heat chamber and adapted for the heat treatment, at an intermediate temperature, of such mixture and its volatilization thereby into gaseous vapors; a container located in said combustion chamber and therein a permeable, refractory obstruction adapted for the heat-treatment, at maximum temperature, of such vapors and to cause reactions among them and rearrangement of their atoms; condensing apparatus; hydro-carbon supply means comprising a pressure tank adapted to contain liquid hydro-carbon and compressed air, a pressure-gage and a sight gage therein to show respectively the pressure and the stand of hydro-carbon therein, means to supply liquid hydro-carbon and means to supply compressed air to said tank, and a feed pipe extending therefrom; steam supply means; means to regulate the quantities of steam and of hydrocarbon fed to the apparatus; means to mix and inject the same into the first-named container; a distributing pipe system adapted to distribute the aforesaid vapors and their derivatives among the containers and condensing apparatus; and connected with said system a pressure gage to show the pressure therein and a pressure regulator adapted to regulate such pressure and reduce it suitably for said condensing apparatus.

5. An apparatus for the continuous manufacture of volatile spirit from a mixture of steam and fluid hydrocarbon by heat treatment at high pressure and comprising a furnace containing a combustion chamber and a convected-heat chamber and a refractory partition separating the same and pierced with holes for the convection of heat to said convected-heat chamber; a sinuous tubular container located in said convected-heat chamber and adapted for the heat treatment, at an intermediate temperature, of such mixture and its volatilization thereby into gaseous vapors; a container located in said combustion chamber and therein a permeable, refractory obstruction adapted for the heat-treatment, at maximum temperature, of such vapors and to cause reactions among them and rearrangement of their atoms; condensing apparatus; hydro-carbon supply means comprising a pressure tank adapted to contain liquid hydro-carbon and compressed air, a pressure-gage and a sight gage therein to show respectively the pressure and the stand of hydro-carbon therein, means to supply liquid hydro-carbon and means to supply compressed air to said tank, and a feed pipe extending therefrom; steam supply means; means to regulate the quantities of steam and of hydrocarbon fed to the apparatus; means to mix and inject the same into the first-named container; a distributing pipe system adapted to distribute the aforesaid vapors and their derivatives among the containers and condensing apparatus; and connected with said system a pressure gage to show the pressure therein, a shock absorber adapted to cushion detonations occurring therein, and a pressure regulator adapted to regulate such pressure and reduce it suitably for said condensing apparatus.

6. An apparatus for the continuous manufacture of volatile spirit from a mixture of steam and fluid hydrocarbon by heat treatment at high pressure and comprising a furnace containing a combustion chamber and a convected-heat chamber and a refractory partition separating the same and pierced with holes for the convection of heat to said convected-heat chamber; a sinuous tubular container located in said convected-heat chamber and adapted for the heat treatment, at an intermediate temperature, of such mixture and its volatilization thereby into gaseous vapors; a container located in said combustion chamber and therein a permeable, refractory obstruction adapted for the heat-treatment, at maximum temperature, of such vapors and to cause reactions among them and rearrangement of their atoms; condensing apparatus; hydro-carbon supply means comprising a pressure tank adapted to contain liquid hydro-carbon and compressed air, a pressure-gage and a sight gage therein to show respectively the pressure and the stand of hydro-carbon therein, means to supply liquid hydro-carbon and means to supply compressed air to said tank, and a feed pipe extending therefrom; steam supply means; means to regulate the quantities of steam and of hydrocarbon fed to the apparatus; means to mix and inject the same into the first-named container; a distributing pipe system adapted to distribute the aforesaid vapors and their derivatives among the containers and condensing apparatus and comprising a valve-controlled pipe connecting the delivery end of the intermediate with the inlet end of the maximum temperature container, a valve-controlled pipe connecting the delivery end of the intermediate with the inlet end of the maximum temperature container, a valve-controlled pipe connecting the delivery end of the maximum temperature container with the condensing apparatus, a valve-controlled by-pass between said pipes and a pressure regulator in said system adapted to regulate the pressure therein and to reduce it suitably for said condensing apparatus.

7. A process for the continuous manufacture of volatile spirit from a vaporous mixture of water and fluid hydro-carbon by heat treatment and consisting in maintaining the pressure of such mixture at about five atmospheres and while so doing heating it to between 400° and 450° C. and thereby volatilizing it into gaseous vapors; bringing such vapors still at such pressure into intimate contact with refractory bodies maintained at a red heat and thereby causing reactions among them, rearrangement of their atoms; and subsequent reduction of the pressure and fractional condensation of the derivatives.

In testimony that we claim the foregoing as our invention we have signed our names in presence of two subscribing witnesses.

AUGUSTE TESTELIN.
GEORGES RENARD.

Witnesses:
GEORGES VANDER HAEGHEN,
EUGÈNE VANDENPLAS.